United States Patent [19]

McVitie

[11] Patent Number: 5,012,515
[45] Date of Patent: Apr. 30, 1991

[54] SECURITY METHOD FOR A DISTRIBUTED DATA PROCESSING SYSTEM

[75] Inventor: David G. McVitie, Congleton, United Kingdom

[73] Assignee: International Computers Limited, London, England

[21] Appl. No.: 537,609

[22] Filed: Jun. 14, 1990

[30] Foreign Application Priority Data

Jul. 20, 1989 [GB] United Kingdom ............... 8916586

[51] Int. Cl.<sup>5</sup> .......................... H04L 9/00; G06F 7/04
[52] U.S. Cl. ...................................... 380/49; 380/48;
340/825.31; 340/825.54; 364/200; 364/222.5;
364/240.8; 364/900; 364/940.61; 364/942.2
[58] Field of Search .................. 380/33, 48, 49, 50,
380/23, 25; 340/825.06, 825.3, 825.31, 825.54;
364/900 MS File, 200 MS File, 222.5, 240.8,
240.9, 937, 940, 940.61, 942.2

[56] References Cited

U.S. PATENT DOCUMENTS 4,763,357  8/1988  Barr ........................................ 380/48
4,800,488  1/1989  Agrawal et al. ..................... 364/200

Primary Examiner—Linda J. Wallace
Attorney, Agent, or Firm—Lee, Mann, Smith, McWilliams & Sweeney

[57] ABSTRACT

A security mechanism is described for a distributed data processing system. Each server in the system maintains a set of security ratings giving its view of the security levels within the system. When a first server wishes to initiate a connection with a second server, the two servers exchange security information, by means of messages, so as to establish an overall security level for the connection, based on a combination of the security information maintained by both servers. However, if the first server decides that the second server cannot be trusted to discuss security, messages are exchanged containing no security information, and each server establishes its own security level for the connection, based on its own locally held security information.

2 Claims, 2 Drawing Sheets

SECURITY METHOD FOR A DISTRIBUTED DATA PROCESSING SYSTEM

BACKGROUND TO THE INVENTION

This invention relates to distributed data processing systems. More specifically, the invention is concerned with a data processing system comprising a number of servers connected together by one or more interconnection routes. By a "server" is meant a unit that provides some service to the system; for example, a computer unit which provides a data processing service or an electronic mail service. The interconnection routes may, for example, comprise a local area network (LAN) or a telephone link.

The invention is particularly concerned with federated computer systems. A federated system is a distributed data processing system in which there is no central controller or data store. Each server is capable of operating autonomously, and there is no master unit for directing the operation of the system.

In such a system, servers can exchange information by setting up connections between them, by way of the interconnection routes. Each such connection between two servers is asymmetric, in that the server at one end starts the connection process. This server is referred to herein as the initiator, while the server at the other end is referred to as the responder.

In a federated system, one important consideration is that of security, i.e. of ensuring that only those with permission to access servers do so. In particular, when a connection is requested, some check has to be made concerning the validity of that connection. Thus, a check must be made as to whether the responder is sufficiently secure to meet the needs of the initiator, whether there is a suitable route between the two servers that will preserve the security of their conversations, and whether the responder is prepared to be used by the initiator.

This problem of providing security is made more difficult by the completely distributed nature of the system, and by the fact that there is no single central authority to control the security of the system.

The object of the present invention is to provide a novel way of overcoming the problem of providing security in a federated system.

SUMMARY OF THE INVENTION

According to the invention there is provided a distributed data processing system comprising a plurality of servers wherein each server separately maintains security information relating to security levels in the system, and wherein, in operation, when a first server initiates a connection with a second server, these two servers exchange security information to establish an overall security level for the connection based on a combination of the security information maintained by both servers.

DESCRIPTION OF AN EMBODIMENT OF THE INVENTION

One distributed data processing system in accordance with the invention will now be described by way of example with reference to the accompanying drawings.

Overall view of the system

Figure 1:
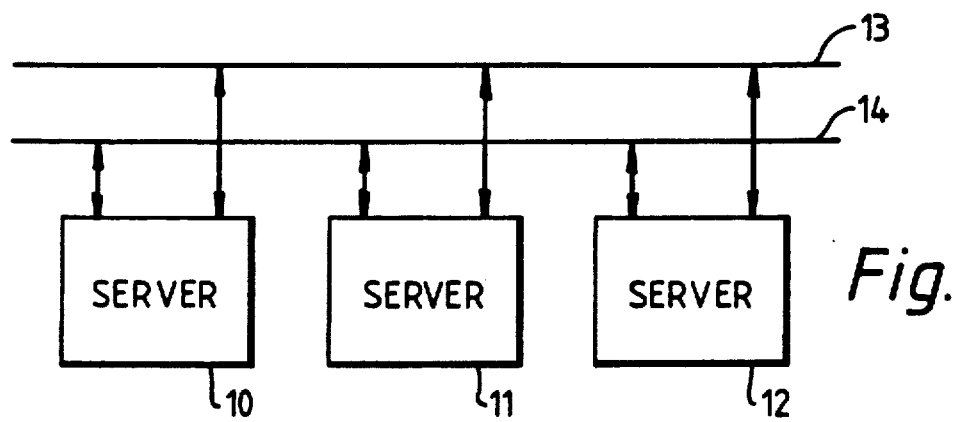
FIG. 1 is a block diagram of a distributed data processing system.

Referring to FIG. 1, the distributed data processing system comprises a plurality of servers 10, 11, 12 interconnected by routes 13, 14.

For example, the servers may comprise free-standing computers, each of which is capable of independent operation, as well as contributing a service to the system as a whole. The interconnection routes may comprise local area networks (LANs) or telephone links.

The system is organised as a federated system; that is, there is no central controller or store for controlling the operation of the system as a whole. Instead, the responsibility for system control is shared among the individual servers.

Security in the system is described by means of security levels which can be assigned to servers and to routes between servers. Because of the federated nature of the system, there is no single repository of information about security levels in the system. Instead, each server maintains its own local view of the security levels in the system. This consists of a table containing a security rating for each server in the system, and for each interconnection route. It is important to note that the local views held in different servers may not be the same; for example, different servers may give a particular route different security ratings.

Security ratings

Each security rating comprises a set of security factors, where each factor in turn comprises a set of values. For example, a security rating for a particular server might be:

(COLOUR=(RED, BLUE, YELLOW), DAY=(MONDAY))

This consists of two factors COLOUR and DAY, where the factor COLOUR consists of three values RED, BLUE and YELLOW, while the factor DAY consists of just a single value MONDAY.

In this example, this security rating indicates that the server is entitled to receive electronic documents with status codes RED, BLUE or YELLOW only, and only on Monday.

A security factor that contains just a single value (such as the factor DAY above) is referred to herein as an exact factor, since it indicates that a particular condition must be matched exactly. Conversely, a factor that consists of more than one value (such as the factor COLOUR in the above example) is referred to herein as an inexact factor, since it indicates that there is a degree of choice about this factor. Similarly, a security rating that contains only exact factors is referred to as an exact rating, while a rating that contains one or more inexact factors is referred to as an inexact rating.

Default ratings

The following rules are specified to cover default conditions, where some or all of the information in a security rating is omitted.

(i) If a security rating is omitted completely, it is assumed that this is equivalent to a rating comprising all possible factors with all possible values present.

(ii) If a factor is omitted from a security rating, it is assumed that this is equivalent to the factor being present with all possible values.

(iii) An empty factor (i.e. one with no values) is not allowed. However, it is possible to give a factor a special NULL value.

Binding security ratings

In operation of the system, different security ratings may be combined by a process referred to as binding. This consists of forming the logical intersection of the ratings, to produce a resultant rating consisting of values common to all these ratings. Where a particular factor is not present in one or more of the ratings, the above default rules apply.

For example consider the two ratings:
(DAY=(SAT, SUN, MON), COLOUR=(RED, BLUE))
(DAY=(MON, TUE)) The result of binding these two ratings will be:
(DAY=(MON), COLOUR=(RED, BLUE))
It should be noted that, in this example, the factor COLOUR is not present in the second of the ratings, and it is therefore assumed as a default condition, that this factor is present with all possible values.

Initiating a connection

Before any two servers can exchange information, a logical link, referred to herein as a connection, must first be set up between them. The server that initiates the connection is referred to as the initiator and the other server is referred to as the responder.

As mentioned above, the security level of a server or route is not known in an absolute manner by a single authority. Rather, the security level ascribed to a particular connection depends on an interaction between the initiator and responder, taking account of the locally held security ratings in each of them.

The following list indicates the various security ratings that may influence the security level of a particular proposed connection.

R1: the initiator's rating of itself.
R2: the initiator's rating of the responder.
R3: the initiator's rating of the route or routes available to connect to the responder.
R4: the responder's rating of itself.
R5: the responder's rating of the initiator.
R6: the responder's rating of the route chosen by the initiator.

Initiator

Figure 2:
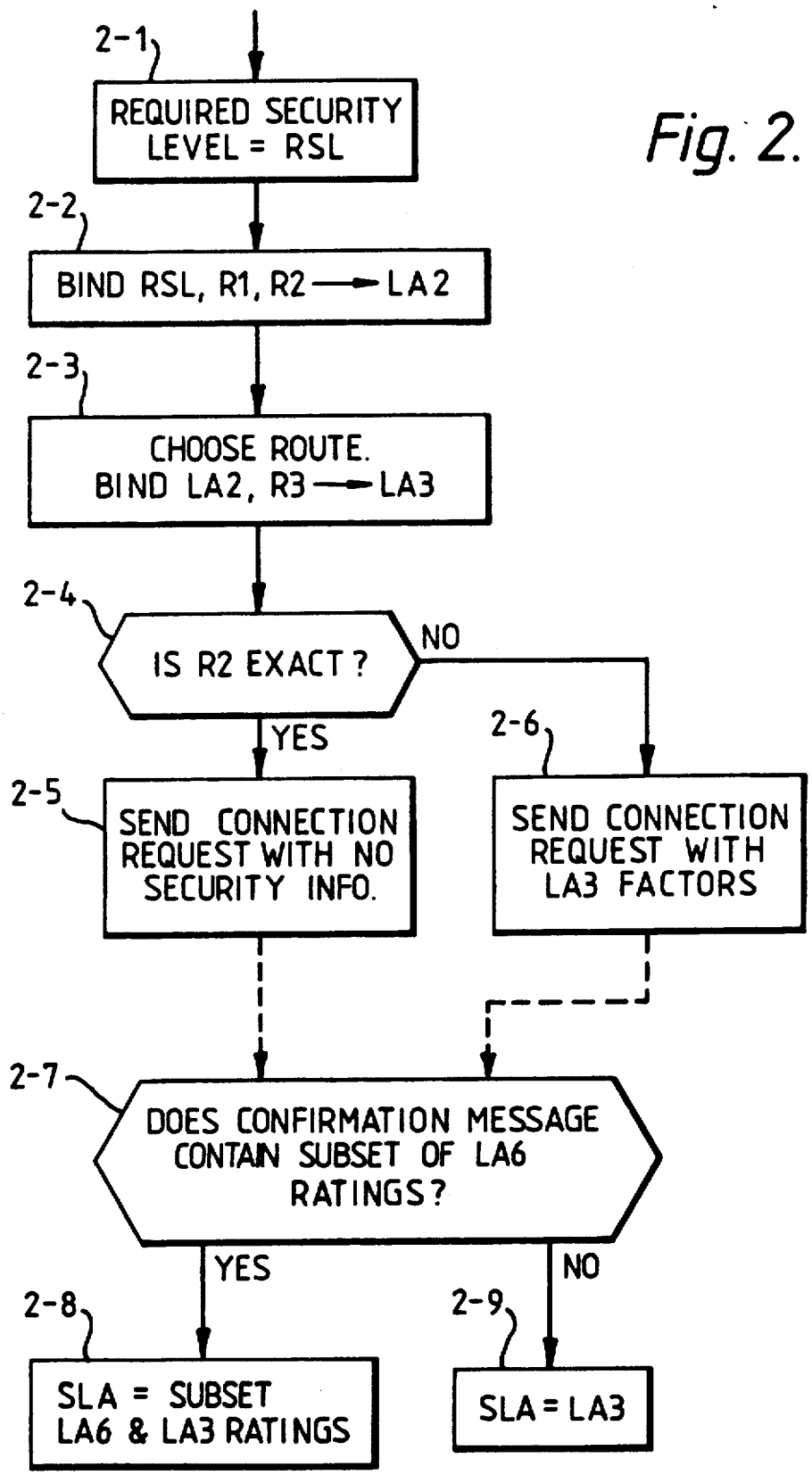
FIG. 2 is a flow chart showing the operations performed by an initiator in setting up a proposed connection.

Referring now to FIG. 2, this shows the operation of the initiator in setting up a connection.

(2-1) The initiator specifies a required security level (RSL) for the connection.

(2-2) The initiator then binds the level RSL with the ratings R1 and R2 to produce a resultant security rating LA2. If LA2 is empty (i.e. there are non intersecting ratings in RSL, R1 and R2) then the attempted connection has failed, since it is not possible to satisfy the security requirements of the initiator.

(2-3) The initiator now selects a route to the responder, and binds the security rating R3 of this chosen route with LA2 to produce a resultant security rating LA3.

If it is not possible to find a route for which LA3 has non-empty ratings, the attempted connection fails.

(2-4) The next action taken depends on whether the rating R2 (i.e. the initiator's view of the security rating of the responder) is exact or inexact.

(2-5) If the rating R2 is exact (i.e. contains only exact factors as defined above), this means that the initiator does not trust the responder to discuss security. That is, the responder cannot be trusted to receive security information or to make decisions about security levels, and the initiator must take all responsibility for the security of the connection.

In this case, therefore, the initiator sends a connection request message to the responder, containing no security information.

(2-6) If, on the other hand, R2 is inexact (i.e. contains at least one inexact factor), this means that the initiator considers that the responder is capable of discussing security levels. The initiator therefore transmits a connection request message to the responder, containing all the factors of LA3 that correspond to inexact factors of R2. These factors represent the initiator's view of what the responder has to know about the required security level. Factors in LA3 which correspond to exact factors in R2 are not transmitted, since the initiator believes that the responder is not capable of discussing these factors.

The net result is that the initiator sends only security information on which it believes the responder can be trusted to behave correctly. If it does not trust the responder at all, it sends no security information to it.

Responder

Figure 3:
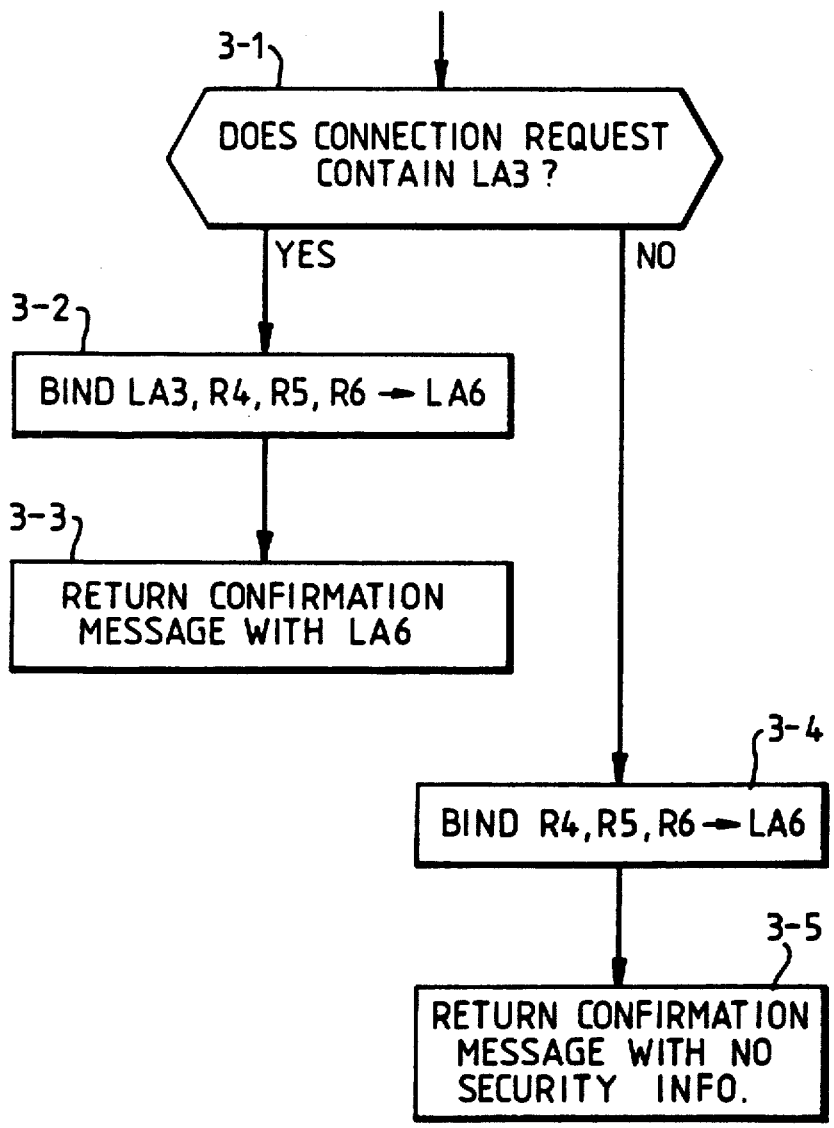
FIG. 3 is a flow chart showing the operations performed by a responder in setting up a proposed connection.

Referring now to FIG. 3, this shows the action of the responder when it receives a connection request message.

(3-1) The action of the responder depends on whether any security information (LA3) is present in the connection request.

(3-2) If security information is present, the responder binds LA3 with R4, R5 and R6 to produce a resultant security level LA6. If LA6 has any empty ratings, the attempted connection has failed.

(3-3) If the attempted connection has not yet failed, it is now considered to have been successful. The responder returns a confirmation message to the initiator, informing it that the connection has been successfully completed, and informing it of the final security level LA6 for the connection for those ratings in LA3. The responder then adopts this level LA6 as its view of the overall security level SLA for this connection.

(3-4) If, on the other hand, there is no security information in the connection request, the responder binds the available local security ratings R4, R5 and R6 to produce the security level LA6, and adopts this as its view of the overall security level SLA of the connection. As before, the responder returns a confirmation message to the initiator, but in this case, the message contains no security information.

Referring again to FIG. 2, the action of the initiator on receiving a confirmation message is as follows.

(2-7) The initiator checks whether the confirmation message contains a security level with a subset of LA6's ratings.

(2-8) If so, the initiator adopts this subset of LA6 and the other ratings of LA3 as its view of the overall security level SLA of the connection.

(2-9) Otherwise, the initiator uses LA3 as its view of the overall security level.

In summary, it can be seen that where the initiator does not believe the responder to be capable of discussing security, it does not transmit any security information to it. In this case, both the initiator and responder rely solely on their own local knowledge of the security levels in the system to decide whether or not the connection succeeds, and each produces its own view of the overall security level for the connection.

On the other hand, where the initiator believes that the responder is capable of discussing security, a dialogue takes place between them to establish an agreed overall security level, based on the local views of both the initiator and the responder.

It should be noted that, in the described system, it is not necessary for the initiator and the responder to have a common security vocabulary; that is, one may consider security factors that the other is completely unaware of. This avoids the need to synchronise the security vocabulary of the servers, and avoids the need for unnecessary exchanges of security information which could, in itself, compromise security.

I claim:

1. A method of operating a distributed data processing system comprising a plurality of servers, each server having security information indicating its own view of security levels in the system, the method comprising the steps:
   (a) sending a message from a first server to a second server, the message containing security information derived from the security information maintained by the first server;
   (b) upon receipt of said message at the second server, combining the security information in the message with the security information maintained by the second server, to form combined security information indicating an overall security level for the connection as viewed by the second server;
   (c) sending a further message back from the second server to the first server, the further message containing said combined security information, and
   (d) upon receipt of said further message at the first server combining the security information in the further message with the security information maintained by the first server, to form further combined security information indicating an overall security level for the connection as viewed by the first server.

2. A method of operating a distributed data processing system comprising a plurality of servers, each server having security information indicating its own view of security levels in the system, the method comprising the steps:
   (a) deciding, on the basis of the security information maintained by a first server, whether a second server can be trusted to receive security information, and sending a message from the first server to the second server, the message containing security information, if any, that the second server is trusted to receive;
   (b) upon receipt of said message at the second server, if the message contains security information, combining that security information with the security information maintained by the second server to form combined security information indicating an overall security level for the connection as viewed by the second server;
   (c) sending a further message back from the second server to the first server, the further message containing said combined security information, if any, and
   (d) upon receipt of said further message by said first server, combining said combined security information, if any, in said further message with the security information maintained by the first server, to form further combined security information indicating an overall security level for the connection as viewed by the first server.

* * * * *